No. 678,519. Patented July 16, 1901.
G. W. ROBINSON.
GARDEN TOOL.
(Application filed Mar. 19, 1901.)
(No Model.)

UNITED STATES PATENT OFFICE.

GRANT W. ROBINSON, OF LODI, WISCONSIN.

GARDEN-TOOL.

SPECIFICATION forming part of Letters Patent No. 678,519, dated July 16, 1901.

Application filed March 19, 1901. Serial No. 51,953. (No model.)

*To all whom it may concern:*

Be it known that I, GRANT W. ROBINSON, a citizen of the United States, residing at Lodi, in the county of Columbia, State of Wisconsin, have invented certain new and useful Improvements in Garden-Tools; and I do hereby declare the following to be a full, clear, and exact description of the invention, such as will enable others skilled in the art to which it appertains to make and use the same.

This invention relates to garden-tools; and it has for its object to provide a construction wherein the tooth-bars may be adjusted to aline in parallel pairs to form a rake, or may be moved to lie in pairs at angles to each other to form cultivators of different widths, or may be moved to lie all parallel to form a cultivator of minimum width, a further and important object of the invention being to provide a construction wherein the teeth will project at all times forwardly.

Figure 1:
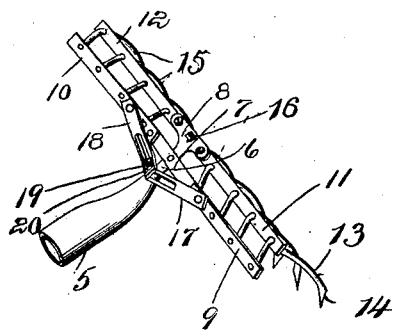
Figure 2:
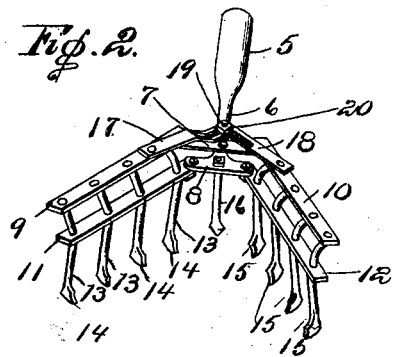
Figure 3:
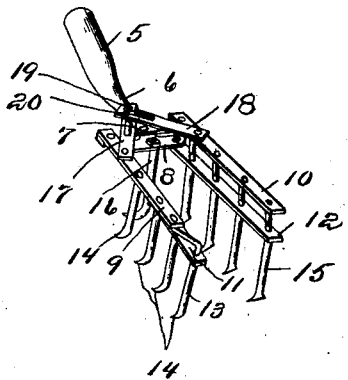

In the drawings forming a portion of this specification, and wherein like numerals of reference indicate similar parts in the several views, Figure 1 is a perspective view showing the apparatus adjusted to form a rake. Fig. 2 is a rear elevational perspective showing the implement adjusted to form a broad cultivator. Fig. 3 is a perspective view showing the implement adjusted to form a cultivator of minimum width.

Referring now to the drawings, the implement comprises a socket-piece 5, having a stem 6, transversely of which and projecting at both sides thereof are secured two parallel plates 7 and 8, of which the plate 8 is spaced rearwardly from the plate 7, and both plates are parallel and lie at right angles to the stem 6. The plate 7 is somewhat longer than plate 8 and projects beyond the ends of the latter, and at the ends of the plate 7 are pivoted two tooth-bars 9 and 10, while two other and slightly-longer tooth-bars 11 and 12 are pivoted to the ends of the plate 8. Teeth 13 are pivotally engaged with the bar 11, and their upper ends above the bar are bent forwardly and then upwardly and are pivotally engaged with the bar 9, so as to hold the bars 9 and 11 at all times parallel, while permitting of pivotal movement of the bars. The lower ends of the teeth 13 are curved forwardly and are broadened, as shown at 14, to form cultivator-teeth for more efficient manipulation of the soil, and with this construction it will be seen that inasmuch as bars 9 and 11 are at all times parallel the parallel planes in which the teeth are curved lie at all times parallel with the axis of the socket-piece 5 and its stem 6. Thus the teeth 13 are projected at all times forwardly irrespective of the adjusted positions of bars 9 and 11. The bar 12 has also teeth 15 pivotally engaged therewith, the upper ends of which teeth are bent forward and then upwardly and engaged with the bar 10 to hold the bars 10 and 12 at all times parallel. Teeth 15 are the same in all respects as teeth 13, and thus all of the teeth at all times project forwardly of the implement. An additional tooth 16 is fixed to the rear end of the stem 6, and the upper end thereof is in the form of a bolt to hold the bar 8 fixedly to the stem. With this construction it will be seen that if the two bars 9 and 10 be adjusted to lie at various angles to the stem the two bars 11 and 12 will be simultaneously adjusted in the same degree, the bar 11 following bar 9 and the bar 12 following the bar 10, and to hold the bars in their different adjusted positions plates 17 and 18 are pivoted to the plates 9 and 10 outwardly of bar 7, and these plates 17 and 18 are slotted longitudinally for engagement over a bolt 19, passed through the stem 6. A nut 20, engaged with this bolt, holds the plates 17 and 18 in different adjusted positions to correspondingly hold the tooth-bars.

It will be noted that the bars at one side of the stem may be adjusted independently of the bars at the opposite side.

In practice modifications of the specific construction shown may be made and any suitable materials and proportions may be used for the various parts without departing from the spirit of the invention.

What is claimed is—

1. A garden implement comprising a socket-piece having a stem, plates fixed to the stem and projecting one beyond the other, tooth-bars pivoted to the ends of the plates, teeth passed upwardly through the rear bar at each side of the stem and having their upper ends bent forwardly and then upwardly and pivotally engaged with the forward bar at the same side of the stem, and having their lower ends curved forwardly, and means for holding the bars at different angles to the stem.

2. A garden implement comprising a stem, tooth-bars pivotally connected with the stem and projecting at opposite sides thereof, the bars at each side of the stem being adapted to lie parallel, teeth pivotally connected with the rear bars at the opposite sides of the stem and having extensions pivotally connected with the corresponding forward bars to hold the bars at each side parallel, and means for holding each pair of bars at different angles to the stem.

3. A garden implement comprising a stem having plates attached thereto transversely thereof, a pair of tooth-bars pivoted to the ends of the plates at each side of the stem, teeth passed upwardly through the rear bar of each pair and having its upper portion bent forwardly and pivotally engaged with the forward bar of the same pair, the lower ends of the teeth being bent in parallel planes, a plate pivoted to a bar of each pair and slidably connected with the stem, and means for holding the plates against sliding movement to hold the bars against pivotal adjustment.

4. A device of the class described comprising a stem, a pair of tooth-bars pivoted at each side of the stem, teeth pivotally connected with one bar of each pair having extensions pivotally connected with the opposite bar of the same pair to hold the bars parallel, and means for holding each pair of bars at different angles to the stem.

In testimony whereof I hereunto sign my name, in the presence of two subscribing witnesses, on the 7th day of February, 1901.

GRANT W. ROBINSON.

Witnesses:
  M. P. BAUKIN,
  J. F. COLLINS.